July 4, 1950          R. H. SHENK          2,513,684
SHAFT COUPLING
Filed April 20, 1945
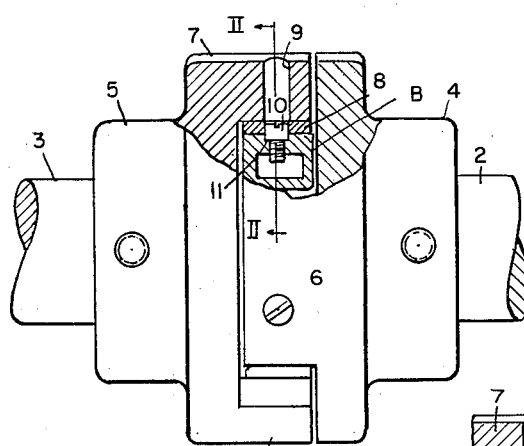
Fig. 1
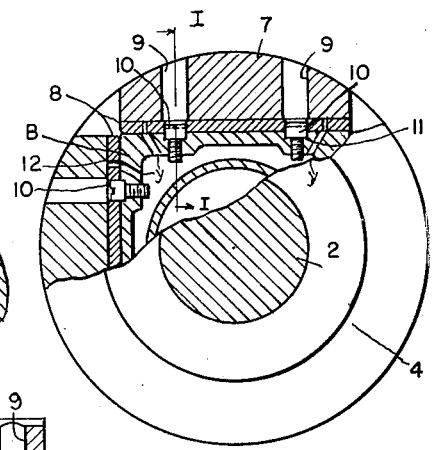
Fig. 2
Fig. 1a
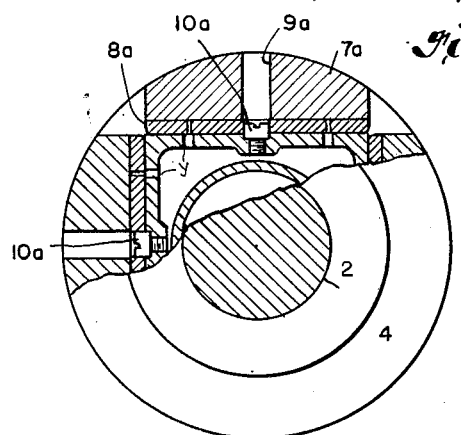
Fig. 3
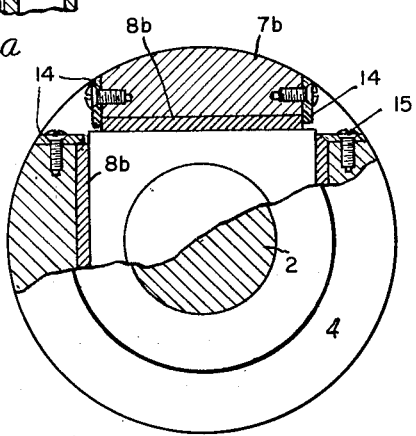
Fig. 4
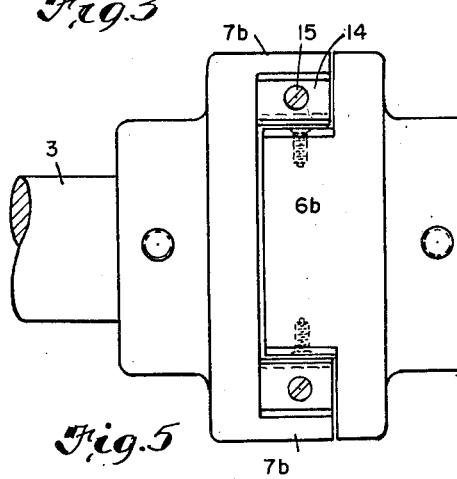
Fig. 5
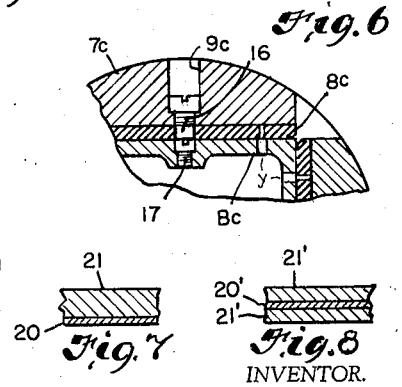
Fig. 6
Fig. 7    Fig. 8
INVENTOR.
ROBERT H. SHENK
BY 
Oberlin & Limbach
ATTORNEYS Patented July 4, 1950

2,513,684

UNITED STATES PATENT OFFICE 2,513,684

SHAFT COUPLING

Robert H. Shenk, Erie, Pa., assignor to American Flexible Coupling Company, Erie, Pa., a corporation of Pennsylvania Application April 20, 1945, Serial No. 589,429

1 Claim. (Cl. 64—31)

This invention relates to shaft couplings, and more particularly of the general Oldham type, i. e., couplings with flange members having projecting inter-meshing jaws with a central space within and a center-block riding in such space and engaging the jaws; and it is among the objects of the invention to provide construction which has increased strength, simplicity and more effective attachment of the parts, and is durable and convenient for repairs, etc. Such construction has greater utility and also requires less maintenance care. Other objects and advantages will appear from the following description.

To the accomplishment of the foregoing and related ends, the invention, then, comprises the features hereinafter fully described, and particularly pointed out in the claim, the following description and the annexed drawing setting forth in detail certain illustrative embodiments of the invention, these being indicative, however, of but a few of the various ways in which the principle of the invention may be employed.

In the annexed drawing:

Fig. 1 is a side elevational view, partly in section on a plane indicated by line I—I, Fig. 2, and showing an embodiment of the invention;

Fig. 1a is a fragmentary sectional detail;

Fig. 2 is an end view of the construction shown in Fig. 1, partly in section on a plane indicated by line II—II, Fig. 1;

Figs. 3 and 4 are similar views of modifications;

Fig. 5 is a side elevational view of the construction shown in Fig. 4;

Fig. 6 is a fragmentary sectional view analogous generally to Fig. 2 showing a modification; and Figs. 7 and 8 are fragmentary enlarged scale sectional details of bearing strips.

In general, the device comprises coupling members having inter-meshing jaws within which a central block rides, and removable bearing strips are inserted between the periphery of the center block and the respective jaws, these bearing strips having a floating mounting and greater strength in the restraining means; and assembly of the various parts when the coupling is mounted is greatly simplified. And, thus, the shafts 2, 3, to be connected may have fixed thereon, in suitable manner, by keys or set screws or both, coupling members 4, 5, having facially projecting jaws 6, 7, in pairs to inter-mesh. And, the bearing strips 8 are arranged between the peripheral faces of the block B and the jaws. As shown in Figs. 1 and 2, the jaws may have two bores 9 extending therethrough and being of a diameter to permit insertion of a screw 10, which may be of a fillister head, cheese head, or socket type of head cap screw, such screws being screw threaded into openings in the block, and preferably the screw heads seat down into a countersunk recess 11. Where desired, a lock-type washer, such as a "Shakeproof" lock washer W, Fig. 1a, may be inserted between the head and its receiving recess. In the bearing strip 8, holes are provided to correspond to the position of the screw heads 10, and with such arrangement, when the screws 10 are out, the bearing strip 8 can be slid into place longitudinally between the center block and the jaw of the coupling member, and then the screws 10 may be set down through the bores 9 and through the openings in the bearing strip, to their final position in the countersunk recess 11. In the operation of the coupling, if the coupling is under mis-aligned conditions a slight relative movement between the periphery of the block B and the bearing strip is thereby possible in a plane transverse of the bearing strip, and also a slight relative movement between the block and the strip in the plane of the strip due to a small clearance between the circumference of the screw head and the hole in the strip, but the strip and the block move across the faces of the jaws with the strip constrained between to compensate for mis-alignment of the shafts. This slight movement or floating of the strip tends to greatly increase the life of the strip, due to more uniform wear and transmittal of the load. Where the center block is of the type having a lubricant-containing chamber 12, the removal of any of the screws 10 permits the supply of grease or other lubricant thereto, and the screw may then be replaced.

Instead of two screws 10, with corresponding openings in the jaw and bearing strip, as shown in Fig. 3, a single screw 10a and corresponding openings 9a etc. may be applied in cases where desired.

Where it is preferred not to perforate the bearing strip, the latter may be also secured while permitting the slight movement as aforedescribed by applying end clips 14, Fig. 4, these being fastened, as by screws 15, to the sides of the jaws 7b, the clips extending over the ends of the bearing strip, the latter being recessed or mitered for engagement thereof. To insert or change a bearing strip with this construction, when one of the clips is off, the bearing strip 8b may be slid endwise into position, and the clip then be put on, the bearing strip thus being held against movement in its own plane.

In some instances it is preferred to provide the bearing strip 8c, Fig. 6, with one or more openings as foregoing, but the screw, instead of being threaded into the center block, is threaded into the jaw 7c at the bottom of a bore 9c, with the plain end of the screw 16 seating into the opening of the bearing strip 8c. In this manner, it is not necessary to tap into the center block as is advantageous in these forms where there is no lubricant chamber. If the center block is of the type containing a lubricant chamber, as is also illustrated in Fig. 6, opening thereto may be provided such as to be closed by a separate screw 17 of a size to go through the reduced end of the bore 9c. As readily understood, for insertion or change of bearing strips in this form of construction, with the screw 16 out the bearing strip 8c may be slid into position between the center block 8c and the jaw 7c, and the retaining screw 16 may then be set down into place, the bearing strip then riding loosely on the smooth end of the screw for such movement as afore-described. For the flow of lubricant from the lubricant chamber, orifices y may be provided, and aligned smaller openings in the strips. Felt or wicking may be placed in the openings y and be retained by the shoulder formed by the smaller hole in the strip.

In all its forms, the screw extending into the hole in the bearing strip constitutes a stud holding the strip from undesired movement in its own plane but allowing slight movement otherwise, and particularly simplifying assembly.

In the construction of the bearing strips, I prefer to use powdered metal, such as bronze, or other bearing alloys, the powdered metal being compressed or molded into desired form. A porous structure is thus had which by its capillarity facilitates the feed and distribution of lubricant to engaging surfaces. In its further detail construction the bearing strip may desirably embody a reinforcing plate or layer 20, Fig. 7, bonded to it. And the facing layer 21 may be of powdered metal, porous bronze, or other bearing metal, or in some cases where desired it may be of organic resilient material, as Bakelite, or other plastics, or rubber composition. The latter materials are particularly thus capable of use where a hard material or reinforcing layer, as of steel or the like, is employed. Instead of having the reinforcing layer on one face, it may be sandwiched between as a center layer 20', Fig. 8, with a facing layer 21' on each side, again, the materials of the reinforcing and the facing being as described foregoing. The layers are bonded together firmly to form substantially integral bearing strips.

Other modes of applying the principle of the invention may be employed, change being made as regards the details described, provided the features stated in any of the following claims or the equivalent of such be employed.

I therefore particularly point out and distinctly claim as my invention:

In a shaft coupling, coupling members having inter-meshing jaws with a central space within, a center block in such space free of anchorage to the shaft and having peripheral faces in planes parallel to the shaft axis, a flat bearing strip slidable endwise into and out of position between each peripheral face of the block and the adjacent jaw face while the block and jaws are assembled, each bearing strip being independent of the others, at least one cylindrical opening through each said bearing strip, and a cylindrical-head screw set into the block with clearance between the opening and the screw-head whereby the screw-head is free in the opening of the bearing strip.

ROBERT H. SHENK.

REFERENCES CITED

The following references are of record in the file of this patent:

UNITED STATES PATENTS

| Number | Name | Date |
| --- | --- | --- |
| 1,612,399 | Thomas | Dec. 28, 1926 |
| 2,075,481 | Thomas | Mar. 30, 1937 |
| 2,110,844 | Shenk | Mar. 8, 1938 |
| 2,131,414 | Westburgh | Sept. 27, 1938 |